United States Patent
Moore et al.

(10) Patent No.: US 7,437,383 B2
(45) Date of Patent: *Oct. 14, 2008

(54) SYSTEM AND METHOD FOR SEARCHING HETEROGENEOUS ELECTRONIC DIRECTORIES

(75) Inventors: Darryl Cynthia Moore, Conyers, GA (US); Sharon E. Carter, Austell, GA (US); Kathryn D. King, Decatur, GA (US)

(73) Assignee: AT&T Intellectual Property I.LP., Reno, NV (US)

( * ) Notice: Subject to any disclaimer, the term of this patent is extended or adjusted under 35 U.S.C. 154(b) by 349 days.

This patent is subject to a terminal disclaimer.

(21) Appl. No.: 11/200,964

(22) Filed: Aug. 10, 2005

(65) Prior Publication Data

US 2005/0273459 A1 Dec. 8, 2005

Related U.S. Application Data

(63) Continuation of application No. 10/002,667, filed on Oct. 31, 2001, now Pat. No. 6,944,610.

(51) Int. Cl.
*G06F 17/00* (2006.01)
(52) U.S. Cl. ............... 707/102; 707/2; 707/3; 707/101; 707/103 R; 707/104.1; 707/10
(58) Field of Classification Search ......... 707/3, 707/10, 104.1, 2, 102, 103 R, 101
See application file for complete search history.

(56) References Cited

U.S. PATENT DOCUMENTS

| | | | | |
|---|---|---|---|---|
| 6,189,003 B1* | 2/2001 | Leal | ...... | 707/2 |
| 6,208,986 B1* | 3/2001 | Schneck et al. | ...... | 707/3 |
| 6,484,177 B1* | 11/2002 | Van Huben et al. | ...... | 707/10 |
| 7,315,860 B1* | 1/2008 | Harvey | ...... | 707/10 |
| 7,349,868 B2* | 3/2008 | Tenorio | ...... | 705/26 |
| 2001/0034733 A1* | 10/2001 | Prompt et al. | ...... | 707/102 |
| 2002/0004794 A1* | 1/2002 | Mito et al. | ...... | 707/3 |
| 2005/0091272 A1* | 4/2005 | Smith et al. | ...... | 707/104.1 |

OTHER PUBLICATIONS

Waiman Cheung et al., "The model-assisted global query system for multiple databases in distributed entreprises", ACM, Oct. 1996, pp. 421-470.*
Michael Stonebraker et al., "Document processing in a relational database system", ACM, Apr. 1983, pp. 143-158.*

* cited by examiner

*Primary Examiner*—Thuy N Pardo
(74) *Attorney, Agent, or Firm*—Scott P. Zimmerman, PLLC

(57) ABSTRACT

The present invention comprises a computerized system and method for searching heterogeneous electronic directories. An embodiment of the system includes a database, containing data necessary to perform a search, a user interface, and a component for performing the searches. Embodiments of the system provide a user with the ability to search directories in multiple locations and in multiple formats, both standard and non-standard, for contacts and to display the results of the search in one unified list. A system administrator or a user determines which directories the system searches and in what order the system performs the search.

20 Claims, 4 Drawing Sheets

FIG. 3A – Prior Art

SYSTEM AND METHOD FOR SEARCHING HETEROGENEOUS ELECTRONIC DIRECTORIES

CROSS-REFERENCE TO RELATED APPLICATIONS

This application is a continuation of commonly assigned U.S. application Ser. No. 10/002,667, filed Oct. 31, 2001, now U.S. Pat. No. 6,944,610, and entitled "System and Method for Searching Heterogeneous Electronic Directories," and incorporated herein by reference in its entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

The present invention generally relates to electronic-directory services. The present invention more particularly relates to searching a plurality of heterogeneous electronic directories.

Electronic directories have become an indispensable tool for many. Users utilize electronic directories at home and in the workplace to determine a contact's postal and email address and telephone number. A problem confronting users of conventional electronic directories is locating a contact that is not in the user's current contacts list.

The contact may not exist in the user's contacts list for various reasons. For example, the contact may be someone to whom the user has never previously addressed an email. Also, the user may utilize multiple email accounts on different email systems, and although the contact is available from one of the user's accounts, the contact is not available from the user's other accounts.

Conventional applications offer various means for searching for contacts. For example, a user within an organization can generally access a global address list. The global address list may provide a list of all users on a network. However, conventional global address lists do not generally include information related to persons external to the organization.

Conventional means exist for conducting other searches. For example, many white/yellow pages and find-a-person web sites exist on the Internet. These sites provide a user with the capability to enter basic search criteria and perform a search to ascertain an individual's or a company's email address, postal address, and telephone number. But these sites are not comprehensive and, often, the same search executed on different web sites will yield very different results.

Users may utilize additional directory resources as well. For example, many organizations provide lightweight directory access protocol (LDAP) directories. LDAP directories may comprise hundreds, thousands, and even millions of entries. For example, Bigfoot Communications, LLC currently provides an LDAP-accessible directory on its Bigfoot.com web site, which, according to the company, includes over 35 million entries.

To utilize an LDAP directory, the user must know the location of the LDAP directory and may need to know additional information as well, such as the user name and password necessary to access the directory. Also, the user may receive a large number of results from an LDAP directory when the search criteria includes a common name; the user may have no way to efficiently and accurately determine which of these entries is that of the desired contact.

Another conventional directory searching approach is the implementation of a regional or national infrastructure to consolidate various directories. For example, RFC 2967 describes a technical infrastructure for Swedish directory access gateways (TISDAG).

Internet standards-related specifications are published as part of the "Request for Comments" (RFC) series of documents. This archival series is the official publication channel for Internet standards documents and other publications of the Internet Engineering Standards Group (IESG), Internet Architecture Board (IAB), and Internet community. The RFC series of documents on networking began in 1969 as part of the original ARPA wide-area networking (ARPANET) project. RFCs cover a wide range of topics in addition to Internet Standards, from early discussion of new research concepts to status memos about the Internet.

RFC 2967 describes a system that provides a single access point for information relating to all Internet users in Sweden. The TISDAG provides a user with the ability to use various client applications to search Whois and LDAP directories of participating Internet service providers. Whois is a directory service containing Internet name and protocol address information.

A disadvantage of the TISDAG and similar approaches is that a complex infrastructure is required before a user can search for a contact. Also, only Internet users' email addresses are available within the system. If the user wishes to contact an internal network user, the user must use the internal contacts or global address list instead.

Also, no lists in a non-standard format may be searched from the TISDAG or similar system. Also, the directory may not be comprehensive because it comprises only the directories of participating Internet service providers. A user must utilize multiple interfaces if the contact is not present in the TISDAG system.

SUMMARY

Embodiments of the present invention address the deficiencies in conventional systems and comprise systems and methods for searching heterogeneous electronic directories for a contact and displaying the results of the search within a single user interface. The directories are heterogeneous in that one or more directories are in a standard format, such as a global address list, and one or more directories are in a non-standard format, such as a hypertext markup language (HTML) page. A contact comprises a person or organization that the user wishes to contact in some manner, electronic or otherwise. An embodiment of the present invention comprises a user interface, a database of available directories, and a component for searching the databases.

The database stores information necessary for searching various directories and displaying the information in the user interface. The database comprises the location of the directory, a format descriptor for the directory, and a search descriptor for the directory.

A single executant may comprise both the user interface and the searching component. For example, an embodiment of the present invention may comprise a web application executing on a web application server. In another embodiment, the application comprises a Microsoft® Visual Basic application executing on a personal computer.

In order to search various directories, an embodiment of the present invention converts a search entered by a user into a format compatible with the directory to be searched. For example, the search or query format converter may convert a hypertext transfer protocol (HTTP) querystring into a lightweight directory access protocol (LDAP) query.

In order to display the search results from various directories, an embodiment of the present invention also comprises a display format converter. The display format converter may convert search results between HTML and XML, text and XML or between any other supported display formats.

In an embodiment of the present invention, the system displays a user interface to a user. The user enters search criteria. The system searches the search database to determine which directories to search. For each directory found, the system connects to the directory, searches the directory using the user-supplied search criteria, formats the results of the search, and displays the formatted results to the user. As a result, the system presents the user with one list that includes search results from each of the heterogeneous directories. The user may then utilize the resulting contact information to create an email message, create a new contact in the user's contacts list, or communicate with the contact in some other manner.

An embodiment of the present invention provides numerous advantages over conventional systems for searching electronic directories. Conventional systems require users to use multiple interfaces to search all available directories. In contrast, an embodiment of the present invention provides a user with the capability to search multiple heterogeneous directories within a single user interface, providing a simple and effective means to perform a search.

Additionally, in an embodiment of the present invention, the user can search directories in which the entries are in standard or non-standard formats. By supporting both standard and non-standard formats, an embodiment of the present invention allows the searching of many directories simultaneously, increasing the likelihood of finding the correct entry.

Also, an embodiment of the present invention provides the user or system administrator with an opportunity to selectively include and exclude the directories to be included in a search. Many directories contain tens or hundreds of entries for common names. Therefore, by limiting the directories to which a search applies, an embodiment of the present invention limits the number of non-relevant results provided to the user. Limiting the number of non-relevant results decreases the amount of time required to execute a search and also reduces the amount of time required for a user to select the desired contact from the list of results.

Further details and advantages of the present invention are set forth below.

BRIEF DESCRIPTION OF THE FIGURES

These and other features, aspects, and advantages of the present invention are better understood when the following Detailed Description is read with reference to the accompanying drawings, wherein:

FIG. 3A is a block diagram, illustrating a conventional storage pyramid.

DETAILED DESCRIPTION

Embodiments of the present invention provide a system and method for searching for a contact in heterogeneous directories and presenting the results of the search in a unified list. An embodiment of the present invention is advantageously implemented as a computer-readable medium on which is encoded computer program code for searching the directories and presenting the results. A contact comprises a person or organization that the user wishes to contact in some manner, electronic or otherwise.

An embodiment of the present invention comprises a database, which includes location, display format and search format information for a plurality of directories. The directories are heterogeneous; one or more of the directories are in a standard format, and one or more directories are in a non-standard format. Standard formats comprise, for example, a contacts list, a global address list, and a lightweight directory access protocol (LDAP) directory. Non-standard formats comprise, for example, a spreadsheet, a delimited text file, and a hypertext markup language (HTML) file. An embodiment of the present invention also comprises a search component to search the directories as well as a user interface for displaying the results of a search.

Figure 1:
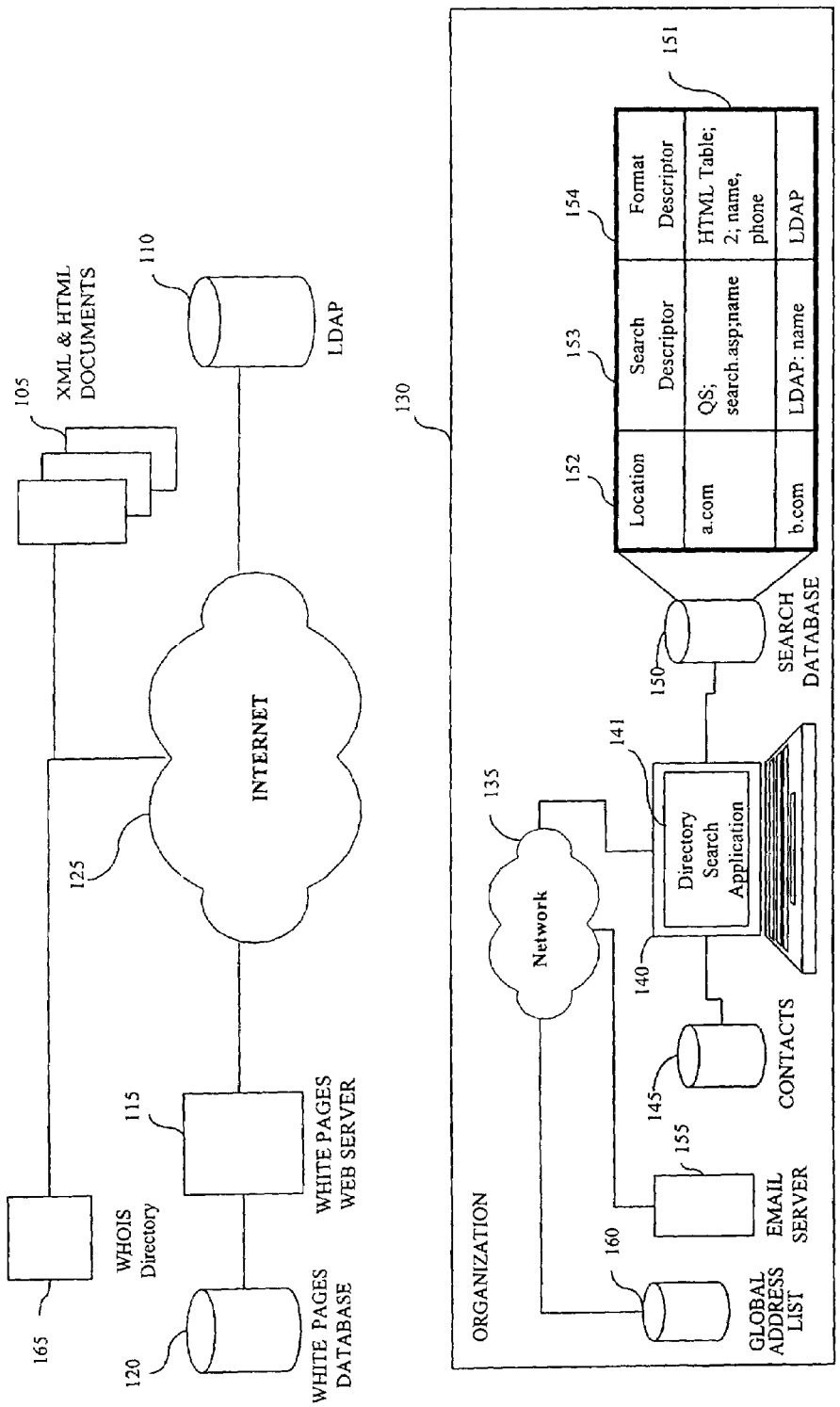
FIG. 1 is a block diagram of an exemplary embodiment and an exemplary environment for operation of an embodiment of the present invention.

FIG. 1 illustrates an exemplary environment for an embodiment of the present invention. In FIG. 1, a personal computer 140 executes a directory search application (DSA) 141. Personal computer 140 is located within an organization 130. In other embodiments of the present invention, personal computer 140 may be located outside of an organization. For example, personal computer 140 may be located in a user's home. A personal computer 140 located in a person's home may or may not have access to various electronic directories located in an organization 130.

Referring again to FIG. 1, personal computer 140 also comprises multiple data stores, including a contacts list 145 and a search database 150. A data store comprises hardware and/or software for storing information. Examples of a data store include a file on a hard drive and a relational database, such as an Oracle® relational database, executing on a database server.

For example, contacts list 145 may comprise a list of contacts in a personal information manager such as Microsoft® Outlook or contacts imported from a Palm™ personal digital assistant or other similar device and stored in a file or files on personal computer 140. The contacts list 145 may also comprise a list of contacts in a database, a spreadsheet, or a delimited file that is stored on the computer 140. The contacts list 145 may instead comprise a database executing on a separate computer, for example, the Oracle® database executing on a Sun Microsystems server.

Similarly, in one embodiment of the present invention, the search database 150 comprises a database on the computer 140. In another embodiment, the search database 150 comprises a table in a relational database on a relational database server.

The search database 150 comprises a table 151 comprising a record for each directory. Each record in the table 151 comprises the location of the directory 152. For example, in the case of a white-pages web site directory, the location fields include the uniform resource locator (URL) of the web site, "a.com" in FIG. 1.

The record also comprises a format descriptor 154. The format descriptor 154 provides a description of the format of the results of a search of the directory. For example, in a white-pages web site, the search results are displayed as an HTML table. The first row of the table contains column headers, and the second row of the table contains results. The format descriptor indicates that the results are presented in an HTML table and also indicates in which row and column search results appear. For example, in the first record in table 151, the format descriptor 154 for the "a.com" white-pages web site is "HTML Table; 2; name, phone." This string indicates that the results are in an HTML table, beginning at row 2 and that the first column is the name and the second column is the phone number.

The record also comprises a search descriptor 153. The search descriptor 153 describes the format of the search required to access the directory. For example, in the case of the white-pages web site, the search is performed by accessing a Microsoft® Active Server Pages program and providing a query string appended to the URL in the HTTP request. For example, in the table 151 shown in FIG. 1, the search descriptor 153 for the white pages web site is "QS; search.asp; name." This search descriptor 153 instructs the DSA 141 to append a query string to the URL and supply a value for the name parameter. An example search of the white-pages web site would utilize the following URL: http://www.a.com/search.asp?name=smith.

The table 151 in the search database 150 may comprise additional fields as well. For example, to determine in what order to search directories, the table 151 may include a search-order field (not shown), comprising an integer. When a query is executed in the search database, the query includes an order by statement, and the order by statement includes the search-order field as the first field.

In one embodiment of the present invention, the DSA 141 searches the directory with the lowest search-order value first. The DSA 141 searches subsequent directories in ascending order of the search-order number.

Computer 140 is further connected to a network 135 within the organization 130. Also attached to the network 135 are various servers, including an email server 155. Email server 155 provides members of organization 130 with email services, such as sending and receiving mail internally and externally. Conventional enterprise-capable email servers provide access to directories comprising entries that correspond to individuals within the organization. These directories are commonly referred to as global address lists and are contained in a database or other data store 160.

Internal network 135 comprises a communication link to the Internet 125. The communication link provides the users of internal network 135 with the ability to access the vast number of resources available on the Internet 125, including lightweight directory access protocol (LDAP) directories 110, extensible markup language (XML) and hypertext markup language (HTML) documents 105, and white-pages web sites 115.

LDAP is an Internet protocol that specifies a method that client applications use to access a central directory server. An LDAP directory 110 is a directory that accepts LDAP queries and returns results complying with the LDAP protocol. To utilize an LDAP directory 110, a user enters configuration information in the user's client application.

For example, in Microsoft® Outlook, the user adds an LDAP service to the list of services utilized by Outlook. The user supplies the LDAP host name, port number and username and password if applicable. Subsequently, when the user creates a new email, the user has the option of searching the LDAP directory 110 in addition to the user's contacts list 145 and the global address list 160. Third parties also provide LDAP directories, comprising lists of contacts and other information. For example, Bigfoot.com is an LDAP directory. Also, Microsoft® Active Directory Service supports LDAP queries.

In addition, other directory services exist which may be advantageously accessed by an embodiment of the present invention. For example, various other services are available on the Internet 125 for finding contact information, such as find-a-person, yellow pages, and white pages sites. In the embodiment of the present invention shown in FIG. 1, a web server 115 is connected to the Internet 125. The web server 115 provides an application or web site to allow an Internet 125 user to access a white pages database 120. A white pages database is analogous to the white pages in a conventional telephone book and comprises a searchable list of names, addresses and telephone numbers. When the user performs a search, the web server 115 generates one or more HTML pages, containing the search results.

Also, an embodiment of the present invention provides the user with a system and method for searching static HTML and XML pages 105. DSA 141 searches a static HTML or XML page 105 in much the same manner as the dynamic white-pages web site 115 described above. The location 152 and format descriptor 154 are similar. However, the search descriptor 153 comprises only the XML or HTML page 105 file name with no need for a querystring or other search descriptor 153 element.

An embodiment of the present invention provides the capability to access various other directories as well. For example, a user may search a WHOIS directory 165 on the Internet 125. Also, DSA 141 may access a relational database directly. For example, DSA 141 may access Microsoft's SQL Server database directly across the Internet 125 via TCP/IP over the appropriate port, generally port 1433, supplying the appropriate identifying information.

An embodiment of the present invention is advantageously implemented as a windows-based DSA 141 on personal computer 140. The DSA 141 comprises a searching component and a user interface for displaying directory entries. In the embodiment shown in FIG. 1, a single executant comprises both the searching component and the directory entry display interface. Other embodiments of the present invention utilize a variety of alternative combination of aspects of the present invention.

For example, the DSA 141 in the embodiment shown in FIG. 1 may comprise a Microsoft® Visual Basic application. In another embodiment of the present invention, the user interface comprises an HTML page created and processed by a web application server. When the results are displayed, each result may comprise a mailto link on the HTML page. The mailto link on the HTML page allows the user to create an email message to a recipient by simply clicking the link. Another embodiment of the present invention may be advantageously implemented as an add-on to an email application, such as Microsoft® Outlook.

Referring again to FIG. 1, the DSA 141 executing on computer 140 accesses the search database 150 within the organization 130 to determine which directories to search and the order in which to search the directories.

An embodiment of the present invention may include a variety of other components to aid in the search process and/or to simplify the presentation of search results. One embodiment of the present invention includes a query format converter component. This component operates to convert searches entered in one format for a particular directory to and from searches in a different format designed for a different directory.

For example, if a user enters search criteria in an HTML form, when the form is submitted, the query parameters are passed as part of the form elements or as a querystring in the hypertext transfer protocol (HTTP) request. In an embodiment of the present invention, the query format converter component converts the querystring to an LDAP-formatted query.

Another embodiment of the present invention includes a display format converter. Various directories provide search results in various formats. A display format converter converts the various formats into a single format for display in the user interface. For example, if the user searches a directory contained in a markup language page 105, the display converter may convert the page to XML for display in the user interface. Additionally, the format converter may convert a text-only page to XML for presentation to the user. The format converter may also comprise an extensible style sheet (XSL).

Figure 2:
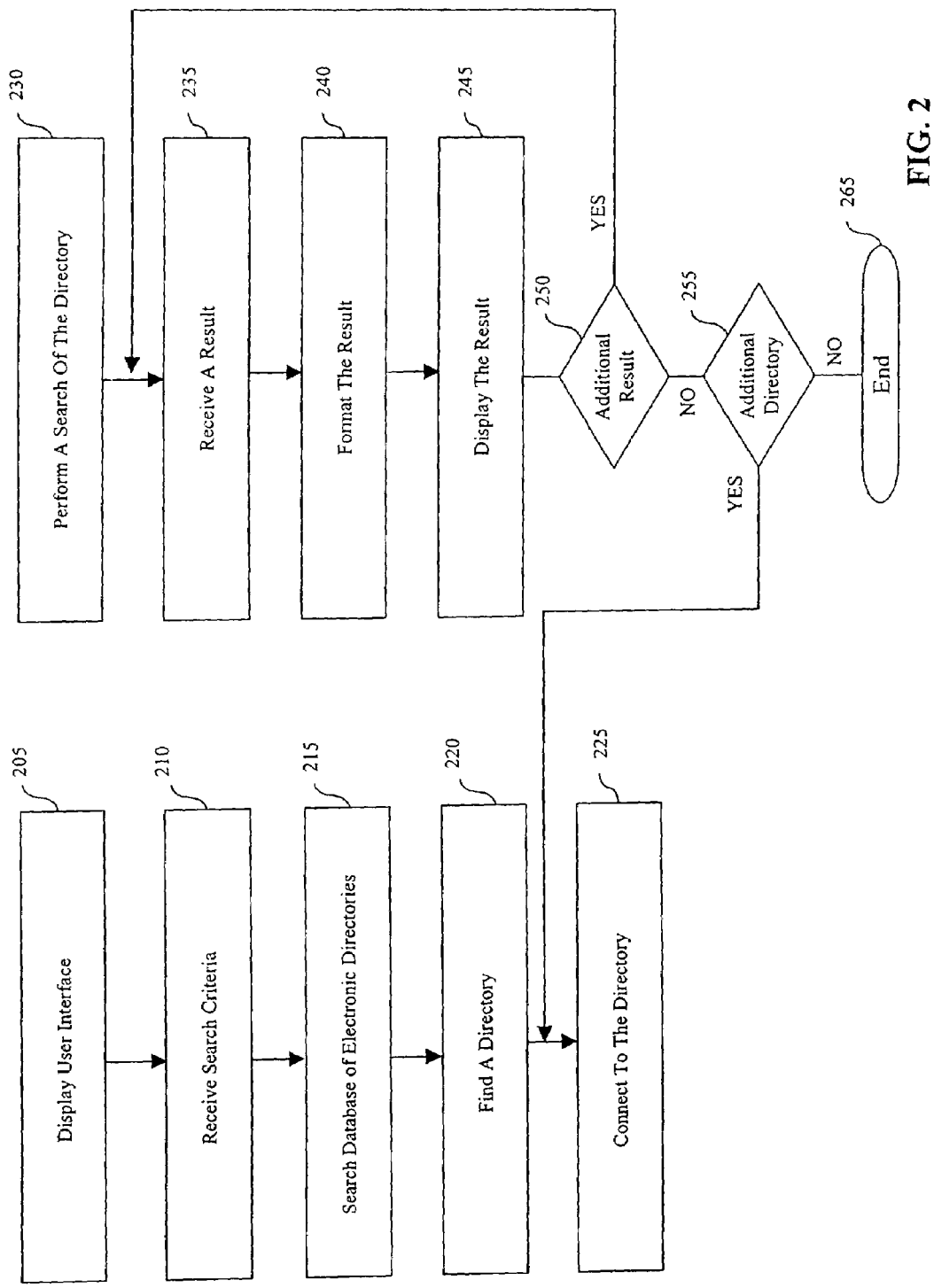
FIG. 2 is a flowchart illustrating an exemplary method executing a search in an embodiment of the present invention.

FIG. 2 illustrates steps that an embodiment of the current invention as a windows-based application executing on personal computer 140 employs to search directories. First, DSA 141 displays a user interface for entering search criteria 205 on the computer 140. The user enters search criteria, which are received by the system 210. The user activates the search component of the DSA 141, and the DSA 141 searches table 151 in the search database 150, 215. For example, the DSA 141 may simply search table 151 and return all the records in table 151. The search results in a list of one or more directories and information associated with each of the directories 220. For example, in a search of table 151, two records are returned by the search.

As described in relation to FIG. 1 above, the search database 150 comprises fields related to the location and to search and display formats of the directory. The search database 150 may also comprise additional fields, such as a search-order field (not shown). In one embodiment of the present invention, the first directory found in step 220 is the directory with the numerically least search-order field value.

Using the location information contained in the search database 150, the system connects to the directory 225 and performs a search 230. The search criteria may be passed directly to the web site or may be converted by a query format converter.

For example, if the subject directory is the white pages web site 115 shown in FIG. 1, the location includes a uniform resource locator (URL), corresponding to the web site. The DSA 141 submits an HTTP request across the Internet 125 that comprises a URL for executing a search of the white-pages web server 115. If the user is searching for the letters "smith" in a name, the DSA 141 submits the following URL in the HTTP request: http://www.a.com/search.asp?name=smith.

Embodiments of the present invention may use various methods for performing a search. One embodiment provides the user with the option of performing a fragment-matching query, a whole-word-matching query, and an exact-match query. Another embodiment provides the user with option of creating a case-sensitive query.

The DSA 141 then receives the results of the search 235 from the directory. For the first result received, the DSA 141 uses the format descriptor in the search database 150 to format the result 240 for display. For example, one embodiment of the present invention formats the result as row in a table in an HTML page. The system then displays the result in a results display user interface in the DSA 141 on personal computer 140, 245.

A directory may return multiple results in response to a search. In an embodiment of the present invention, the application determines if additional results exist 250 and if so, repeats the steps 235 through 245.

A search database 150 may comprise one or many records, wherein each record corresponds to a directory. An application according to the present invention determines whether additional directories exist in the results list 255. If so, the DSA 141 repeats steps 225-250 for each additional directory found in the database 150. Once all directories have been searched, the process ends 265. At the conclusion of the process, the user views one unified list in the DSA 141, comprising the results from all of the searches of all of the various heterogeneous directories.

An embodiment of the present invention may be more clearly understood as a derivation of the storage pyramid. FIG. 3A illustrates a conventional storage pyramid used to determine storage media types in a DSA 141, 301. The storage pyramid 301 illustrates the tradeoff between access speed 302 and cost in dollars 303. Access speed 302 and cost 303 are directly related; as access speed 302 increases, so does cost 303. In other words, the cost to store a specified amount of data in a storage medium depicted in the base of the pyramid 301 is lower than the cost of storing that same amount of data in a storage medium depicted in the top of the pyramid 301.

In a conventional application of the storage pyramid 301, a system architect identifies multiple types of data in a system, which must be stored in one of the following storage media: random access memory 304, magnetic disk 305, tape or optical disk 306 or off-line storage 307. The architect determines where to store each type of data by balancing the need for quickly accessing the data against the cost necessary to implement the particular storage media.

Figure 3B:
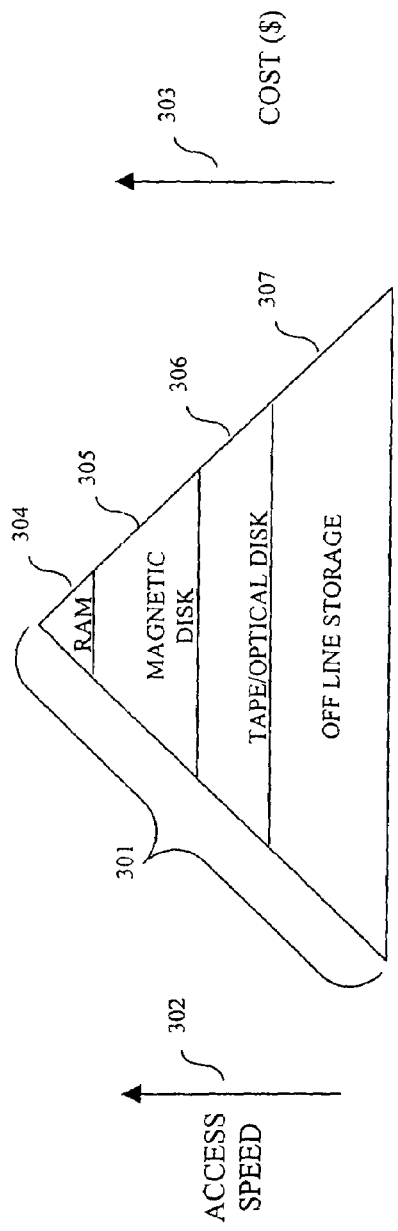
FIG. 3B is a block diagram, illustrating an electronic directory search pyramid in an embodiment of the present invention.
Figure 3B:
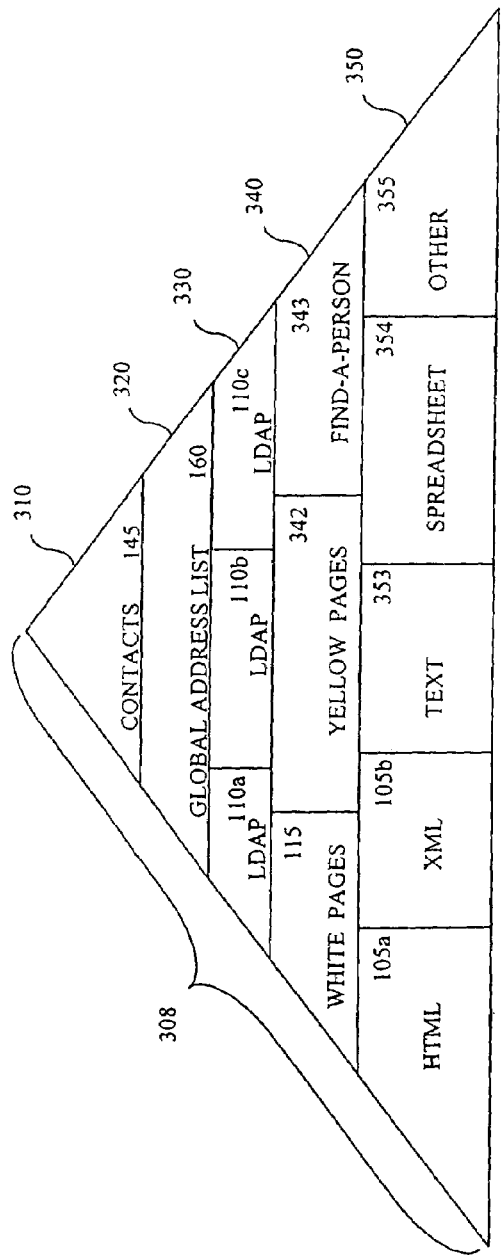

An embodiment of the present invention similarly comprises multiple types of directories, as illustrated in FIG. 3B as a derivation of the common storage pyramid 301, including the various elements illustrated in FIG. 1. Electronic directory search pyramid (EDSP) 308 includes multiple levels, including similar types of directories 310, 320, 330, 340, 350. The directories appearing at the top of the EDSP 308 are directly accessible to an embodiment of the present invention, requiring minimal administration time from an administrator to make a directory available.

In contrast, the directories located at the base of the EDSP 308 require the administrator to expend time and effort to determine the location of the directory and to document the format of the directory. The layers between represent compromises between these two extremes.

In addition, the EDSP 308 illustrates a logical search progression for an embodiment of the present invention. A search would logically begin with the directory sources at the top of the pyramid 308 and progress to those at its base. In one embodiment of the present invention, DSA 141 performs the search in just such a manner. In other embodiments, DSA 141 employs various alternative algorithms in searching heterogeneous directories.

For example, in EDSP 308, the uppermost layer of the pyramid 310 comprises a contacts list 145. In an embodiment of the present invention, the contacts list 145 is located on the user's computer 140. Access to this directory 145 is very fast and initial setup of the directory 145 requires minimal resources from a system administrator. For example, the system administrator may create a simple entry in the search database specifying that the contacts list 145 be searched first.

The second level 320 of EDSP 308 comprises the global address list 160. Access to the global address list 160 is somewhat slower than access to the contacts list 145. Also, gaining access to the global address list 160 require a system administrator to add the location of the global address list 160 on the network 135 to the search database 150.

Access to a lightweight directory access protocol (LDAP) directory 110 is provided in a similar fashion. To access an LDAP 110a, 110b, 110c on the third level of the pyramid 330 requires that the system administrator enter a location of the LDAP 110a, 110b, 110c on the Internet 125 into the search database. As shown in FIG. 3B, several LDAP directories 110a, 110b, 110c may be accessed in an embodiment of the present invention.

The remaining levels in the EDSP 308 are slower to access and require additional effort on the part of a system administrator. For example white pages 115, yellow pages 342 and find-a-person 343 on the fourth level 340 are common types of web sites on the Internet 125. In order to access a web site such as these, the administrator must first determine the format of a search string that is sent to the site.

For example, searching a white pages web site 115 may require supplying a person's last name and state of residence as part of a querystring. When the search is submitted, the web site responds with a hypertext markup language (HTML) page containing the results of the search. In an embodiment of the present invention, the system administrator enters the format and parameters of the search string as well as the format characteristics of the resulting web page. DSA 141 utilizes this information to submit a search and to display the results. Yellow pages 342 and find-a-person 343 web sites require similar administrative processes.

The base level of the pyramid 350 comprises the most administratively difficult sources of contacts. These sources exist in non-standard formats and must be carefully documented in the search database 150 to be utilized successfully. Sources in the fifth level 350 of the EDSP 308 comprise HTML and XML pages 105a, 105b, text files 353, spreadsheet files 354, and other files 355 existing on the network 135 or Internet 125. Once a user or system administrator identifies a location of a file, the system administrator must enter the location and format of the file into the search database so that the user interface executing on the user's computer 140 may display entries from the directory.

Once all of the entries for the various directories have been created in the search database 150, the user of an embodiment of the present invention can begin searching for contacts. A DSA 141 according to the present invention may search any level of the pyramid in any order. The actual order the DSA 141 employs is based on preferences specified by the user, taking into account issues such as access and processing speed.

Figure 4:
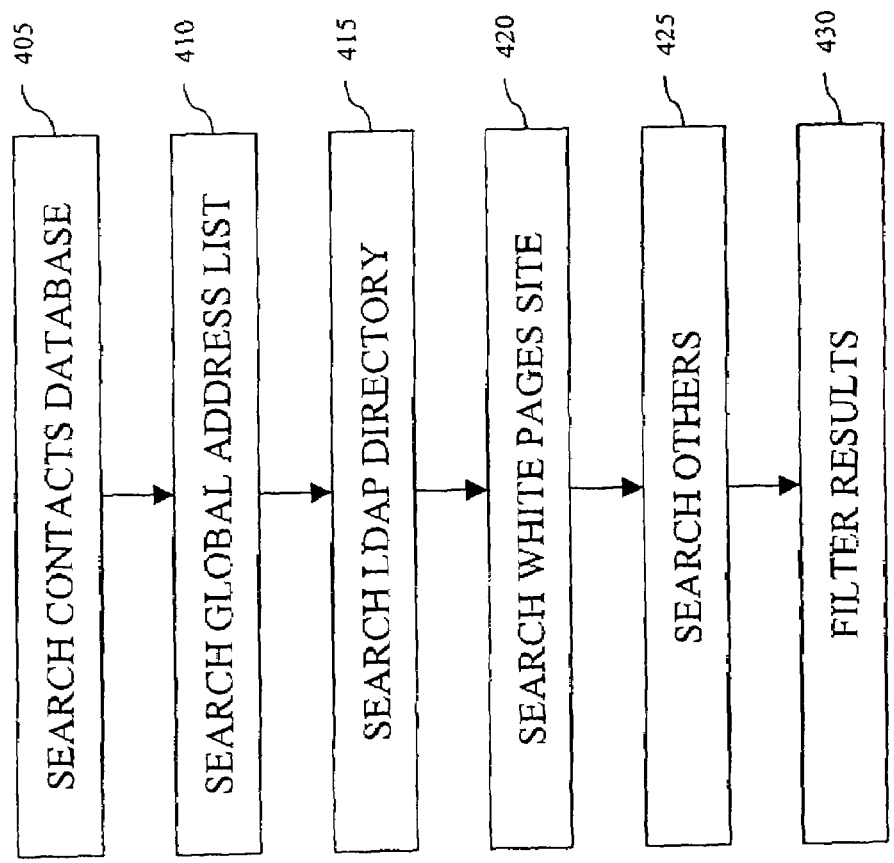
FIG. 4 is a flowchart illustrating the search order of various directories in an embodiment of the present invention.

FIG. 4 illustrates one process for searching various contacts based on preferences specified by a user or system administrator. According to the process illustrated in FIG. 4, the DSA 141 begins by searching the contacts list 145, 405. Various embodiments of the present invention may cease searching once an entry is found, or may alternately, continue searching through the EDSP 308 until either all directories have been searched or the user stops the searching process.

In the embodiment illustrated in FIG. 4, the DSA 141 continues the process by searching the global address list 160, 410. Once the search of the global address list 160 is complete, the DSA 141 searches a white pages web site 115. The DSA 141 continues to search additional sites such as those containing XML and HTML documents 105, 425.

Once the DSA 141 has found a set of results, corresponding to the search criteria, the DSA 141 may filter the results 430. For example, the user interface in an embodiment of the current invention may provide the user with the ability to specify a business name. Various web sites may return business name in a search result but not allow a user to specify the business name as a search parameter. In an embodiment of the present invention, DSA 141 applies a filter to results returned from such a web site, presenting to the user only the results that match the user's search criteria.

An embodiment of the present invention also comprises administrative functionality. For example, an administrator or user has the capability to add and modify entries in the search database. If a user identifies a new directory of contacts that the user determines would be a valuable addition, an administrative function allows that directory to be inserted into the search database 150.

Also, an embodiment of the present invention comprises components to bill users of the DSA 141 for searches. The user may be billed on a per search basis. For example, the user may pay a charge to perform 100 searches. Also, as with many conventional on-line database resources, the user may pay a charge based on the time spent accessing the DSA 141. For example, the user may pay a fixed charge per minute regardless of the number of searches performed or results returned. Billing may also be based on some other appropriate measure.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A system for searching for a contact, comprising:
a computer storing a database in memory and receiving a search criterion, the computer searching the database comprising a plurality of references to electronic directories, the database also comprising a search-order field, the search-order field determining an order in which the plurality of references is searched, the search-order field having an integer value, such that a reference having a lowest numerical value within the search-order field is first searched, and subsequent references are searched in an ascending order of the search-order field.

2. The system of claim 1, wherein each of said plurality of references comprises:
a location of an electronic directory;
a format descriptor of said electronic directory; and
a search descriptor of said electronic directory.

3. The system of claim 1, further comprising a query format converter.

4. The system of claim 3, wherein said query format converter comprises a hypertext transfer protocol (HTTP) querystring to lightweight directory access protocol (LDAP) query converter.

5. A method for searching for a contact, comprising:
receiving a search criterion; and
searching a database comprising a plurality of references to electronic directories, the database also comprising a search-order field, the search-order field determining an order in which the plurality of references is searched, the search-order field having an integer value, such that a reference having a lowest numerical value within the search-order field is first searched, and subsequent references are searched in an ascending order of the search-order field.

6. The method of claim 5, wherein each of said plurality of references comprises:
   a location of an electronic directory;
   a format descriptor of said electronic directory; and
   a search descriptor of said electronic directory.

7. The method of claim 5, further comprising receiving a result of said search, formatting the result, and displaying the result.

8. The method of claim 7, further comprising:
   accepting a selection of said result in a contact search user interface; and
   in response to said selection, creating an email message addressed to an email address associated with said selection.

9. The method of claim 5, wherein after the step of searching said database, the method further comprises finding a directory.

10. The method of claim 5 further comprising:
    searching for a directory of contacts; and
    inserting a record corresponding to said directory in said database.

11. The method of claim 5, further comprising converting said search criterion into a format supported by said electronic directory.

12. The method of claim 5, further comprising billing for the search.

13. The method of claim 12, wherein said billing comprises billing a fixed amount per search.

14. The method of claim 12, wherein said billing comprises billing a fixed amount per time period.

15. The method of claim 5, wherein said search comprises a query selected from the group consisting of a fragment-matching query; a whole-word-matching query; and an exact-match query.

16. The method of claim 5, further comprising filtering said result based on said search criterion.

17. A computer-readable medium on which is encoded computer program code for performing a method, the method comprising:
   receiving a search criterion; and
   searching a database comprising a plurality of references to electronic directories, the database also comprising a search-order field, the search-order field determining an order in which the plurality of references is searched, the search-order field having an integer value, such that a reference having a lowest numerical value within the search-order field is first searched, and subsequent references are searched in an ascending order of the search-order field.

18. The computer-readable medium of claim 17, wherein each of said plurality of references comprises:
   a location of an electronic directory;
   a format descriptor of said electronic directory; and
   a search descriptor of said electronic directory.

19. The computer-readable medium of claim 17, further comprising computer program code for:
   accepting a selection of said result in said contact search user interface; and
   in response to said selection, creating an email message addressed to an email address associated with said selection.

20. The computer-readable medium of claim 17, further comprising computer program code for billing for the search.

* * * * *